(12) United States Patent
Neher et al.

(10) Patent No.: US 7,242,322 B2
(45) Date of Patent: Jul. 10, 2007

(54) SECURITY TRACKER (75) Inventors: Timothy Neher, Foster City, CA (US); Anthony LaRochelle, San Jose, CA (US); Bob Jacobsen, Pacifica, CA (US); Ali Naddaf, San Jose, CA (US); Simon Swain, Mountain View, CA (US); Richard Rowe, Round Lake, IL (US)

(73) Assignee: Wherify Wireless, Inc., San Mateo, CA (US)

( * ) Notice: Subject to any disclaimer, the term of this patent is extended or adjusted under 35 U.S.C. 154(b) by 0 days.

(21) Appl. No.: 11/126,827

(22) Filed: May 10, 2005

(65) Prior Publication Data

US 2006/0017551 A1    Jan. 26, 2006

Related U.S. Application Data

(63) Continuation of application No. 10/454,809, filed on Jun. 4, 2003, now abandoned.

(51) Int. Cl.
*G08G 1/123* (2006.01)
(52) U.S. Cl. ............... 340/989; 340/988; 340/991; 340/431; 340/426.1
(58) Field of Classification Search .................. None
See application file for complete search history.

(56) References Cited

U.S. PATENT DOCUMENTS

| | | | | |
|---|---|---|---|---|
| 4,221,380 A * | 9/1980 | Miller et al. | ................... | 40/538 |
| 4,897,642 A * | 1/1990 | DiLullo et al. | .......... | 340/10.41 |
| 5,917,433 A * | 6/1999 | Keillor et al. | .............. | 340/989 |
| 6,212,455 B1 * | 4/2001 | Weaver | ....................... | 701/45 |
| 6,313,791 B1 * | 11/2001 | Klanke | .................. | 342/357.17 |
| 6,380,883 B1 * | 4/2002 | Bell et al. | ...................... | 342/70 |
| 6,737,962 B2 * | 5/2004 | Mayor | ....................... | 340/431 |
| 6,737,963 B2 * | 5/2004 | Gutta et al. | ................. | 340/435 |
| 7,040,435 B1 * | 5/2006 | Lesesky et al. | ............. | 180/167 |

\* cited by examiner

*Primary Examiner*—Daniel Wu
*Assistant Examiner*—Son Tang
(74) *Attorney, Agent, or Firm*—Wilson Sonsini Goodrich & Rosati (57) ABSTRACT

A covert activity monitoring apparatus and conditional response system having a response apparatus comprising a sensor interface and a wireless interface and one or more sensors having a predetermined conditional interrupt that can result in the response apparatus logging an activity for later download and/or transmitting an alarm condition to a remote monitoring system. In addition the remote monitoring system can initiate a locator sequence for the article incorporating the activity monitoring system.

2 Claims, 6 Drawing Sheets

FIG. 1

| Trailer Event 56 | 3 Input Lines Combination 58 | Function 60 | QNC Header Status 62 | Enabled By 64 |
|---|---|---|---|---|
| Trailer Connected While Door is Closed | A | A Single Non-Emergency Locate | Latch = 1 Lock = 1 Tamper = 0 | Normal Display |
| Trailer Disconnected While Door is Closed | B | A Single Non-Emergency Locate | Latch = 0 Lock = 1 Tamper = 0 | Local Lock |
| Door Opened While Trailer Disconnected | C | A Single Emergency Locate | Latch = 0 Lock = 0 Tamper = 1 | Local Emergency |

SECURITY TRACKER

CROSS-REFERENCE

This application is a continuation application of Ser. No. 10/454,809, filed Jun. 4, 2003 now abandoned, which is incorporated herein by reference in its entirety and to which application we claim priority under 35 USC § 120.

BACKGROUND OF THE INVENTION

1. Field of the Invention

The present invention relates generally to asset management systems and, more specifically, to a covert activity monitoring apparatus and conditional response system comprising a response apparatus and one or more sensors having a predetermined conditional interrupt that can result in the response apparatus logging an activity for later download and/or transmitting an alarm condition to a remote monitoring system. In addition the remote monitoring system can initiate a locator sequence for the article incorporating the activity monitoring system.

The response apparatus is comprised of a sensor interface and a wireless interface. The sensor interface controls the input and output with the one or more sensors while the wireless interface can be engaged by the sensor interface or the remote monitoring system to initiate a location sequence.

The covert activity monitoring apparatus and conditional response system is an asset management system used to preprogram event responses from at least one event indicator comprising any sensor or electronic apparatus that responds to a stimulus in a predetermined manner and generates a determinable signal to said stimulus. The determinable signal can be an electrical or fiber optic signal or propagation of an electromagnetic wave, such as radio, infrared, visible light or ultraviolet signal.

Sensor circuitry is operable to determine the occurrence of a stimulus event and coupled to the sensor interface of the activity monitoring and conditional response system. Since the acceptable environmental parameters are predefined, the stimulus event is easily predeterminable. Therefore, the type of activity to be monitored incorporates the appropriate monitoring sensor communicating with the sensor interface of the activity monitoring and conditional response system which determines the event response that will be initiated upon receipt of the sensor signal triggered by the stimulus event. In some instances, the preprogrammed response may be to record the event for later download and analysis or may include actively controlling various subsystems of the monitored article.

In the preferred embodiment, the monitored article is a portable sealable shipping container used in the transportation of freight aboard ships, rail cars and motorized vehicles, such as tractor hauled trailers. Accordingly, the present invention provides means for managing the assets within the container whether or not the container is tethered to a transportation medium such as a tractor.

Assets within a shipping container may require more care than moving the freight from point 'A' to point 'B'. The conditions under which the freight was transported or the environment within the container may determine the value of the freight upon reaching its destination, such as maintaining the temperature within a refrigerated unit. In addition, the obvious paramount necessity is to prevent tampering with or theft of the freight. Therefore, the response apparatus of the present invention is a programmable device wherein an applicable event response is programmed into the sensor interface as determined by the user.

For example, in a vehicle, this may include controlling engine speed and/or braking or an emergency communication can be automatically transmitted, using the present invention's incorporated telemetry apparatus, to a remote guardian for recording or other predetermined guardian response, such as initiating a locator sequence.

As used herein, the sensor interface includes a microcontroller communicating with at least one sensor providing information relating to the sensor status with a predetermined event indicator sequence to be executed that can include recording the event as well as initiating a locate sequence using the wireless interface.

With the advent of geo-positioned satellites, the location of an asset is precisely ascertainable through trilateration of satellite signals, such as those broadcast by the U.S. Global Positioning System (GPS), Russian Global Navigation Satellite System (GLONASS) and the European Global Navigation Satellite System (GNSS) and Galileo System. In consideration of these available and highly accurate systems, the present invention's wireless interface uses one or more position determination modules to define the location of a monitored asset for recording or immediate broadcast. Notwithstanding some unforeseen advantage, the preferred embodiment incorporates a GPS module and wireless interface into a basic locator unit working in conjunction with the aforementioned sensor interface to form a 'Security Tracker' device, which for clarity and illustrative purposes is described in a tractor-trailer application.

2. Description of the Prior Art

There are other tracking/locator devices designed for freight. While these locator devices may be suitable for the purposes for which they were designed, they would not be as suitable for the purposes of the present invention, as hereinafter described.

Therefore it is felt that a need exists for a covert device that can be incorporated into the body of a container having means for communicating with at least one sensor and whereby when said sensor is triggered, means for recording and or transmitting said information to a remote location is performed.

Furthermore, a need exist wherein the remote monitoring location is provided with means for designating various sensors to be utilized in the management of the container freight and what action should be initiated when said sensor(s) are triggered. Whether that action is to record the sensor data for later download or whether an emergency transmission to the remote location is initiated.

SUMMARY OF THE PRESENT INVENTION

The security tracker of the present invention is comprised of the basic tracker (Wireless network and GPS) and the security peripherals. A peripheral PIC controller controls the security peripherals and can communicate with the main controller over a serial link or using a discrete link. When using the discrete interface the peripheral controller creates pulses on three lines (the buttons). The pulses can be short or long, creating fourteen different combinations that can be interpreted by the main controller as fourteen different commands. The peripheral controller interfaces with the protected environment using six discrete lines that can be configured as input or output depending on the application. In addition, there are two discrete lines that are connected directly to the main controller. There is one output line from the main controller to the outside.

Mobile Unit Tracker

In one application of the invention, Mobile Unit Tracker (MUT), the Security Tracker is placed in the tail light fixture of the trailer drawing its power from the tail light power source. The following circumstances will cause the MUT to initiate a location cycle:

When the trailer is connected to the truck, when the trailer is disconnected from the truck and when the trailer door is opened while the trailer is disconnected, which will initiate an emergency location.

In this application, at all times the Basic Tracker is powered off. Only the peripheral controller is powered and draws minimally current and should be capable if being unattended for several months. Solar cells can be used to make the tracker run indefinitely.

When the trailer is connected to the truck, the basic tracker may be on to allow real-time locations and other interrogations initiated from the monitoring center.

The tracker can be programmed to stay alive when disconnected from the truck. When it is disconnected from the truck power source the tracker can be programmed to wake up periodically and capture its location and store internally or send them back with each locate. When a location is needed, the peripheral controller powers up the basic tracker to initiate a location.

The center is in charge of initiating the basic tracker down. It can be configured to which of the above cases to ignore. The tracker can monitor the following types of conditions: temperature, cargo, intrusion, angle of tractor, motion, acceleration and it can be geofenced. It can transmit data from each of these sensors as well as visible light, infrared images and audio information.

Adapting the Tracker/LSC Software

The peripheral controller using the buttons 3 line interface can send the following commands to the Basic Tracker;

The status byte of the QNC header will convey the following:

Latch bit—is the trailer connected to the truck.

Lock bit—is the trailer door open.

Tamper—Set to 1 if the door is opened while the trailer is disconnected.

Powering the Basic Tracker Down

After initiating the two non-emergency events the peripheral controller will wait 5 minutes and power the basic tracker down. For an emergency locate case, however, to make sure the tamper is reported, the peripheral controller will not power the Basic Tracker down. The LSC will control that by sending an unlock command. This will send a signal to the peripheral controller to power the Basic Tracker down.

Wireless Network and GPS Antenna

To prevent disabling the device by disconnecting the antennas, the device will have a dual GPS antenna setup, and decoy antennas will be installed on the trailer.

The Trailer Cargo Connection

The following are additional features that can be added to the Trailer Security Tracker:

the ability to identify if the trailer is empty or not. This can be done using laser beams that crisscross the inside of the trailer.

The ability to read a RF tag attached to the cargo, send the information to the center to match the trailer with the cargo it is carrying.

Other Applications

With the same basic design the Security Tracker can support connecting a digital camera and sound recorder and transmitting the information to the center over the wireless network.

A primary object of the present invention is to provide an asset management system for sealed shipping containers.

Another object of the present invention is to provide a security tracker comprising a covert activity monitoring apparatus.

Yet another object of the present invention is to provide a security tracker having sensors communicating with a peripheral controller.

Still yet another object of the present invention is to provide a security tracker having means for determining the location of said apparatus.

Another object of the present invention is to provide a security tracker having a peripheral controller communicating with a main controller.

Yet another object of the present invention is to provide a security tracker having a main controller communicating with a wireless transceiver.

Still yet another object of the present invention is to provide a security tracker that can be incorporated into a tractor-trailer lighting fixture.

Another object of the present invention is to provide a security tracker having a programmable controller.

Yet another object of the present invention is to provide a security tracker having means for varying the programming of the controller depending on the type of sensor data.

Still yet another object of the present invention is to provide a security tracker for a shipping container wherein condition related to the container can be recorded for later download.

Another object of the present invention is to provide a security tracker for a shipping container wherein an emergency communication to a remote location can be initiated in response to a predetermined container condition.

Additional objects of the present invention will appear as the description proceeds.

The present invention overcomes the shortcomings of the prior art by providing an asset management systems comprising a covert activity monitoring apparatus and conditional response system having a response apparatus and one or more sensors having a predetermined conditional interrupt that can result in the response apparatus logging an activity for later download and/or transmitting an alarm condition to a remote monitoring system. In addition the remote monitoring system can initiate a locator sequence for the article incorporating the activity monitoring system.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the security tracker of the present invention. With regard to the reference numerals used, the following numbering is used throughout the various drawing figures.

10 security tracker
12 basic locator
14 peripheral controller
16 position determination module
18 main locator controller
20 serial communication
22 bus
24 first pulse input
26 second pulse input
28 third pulse input
30 serial communication
32 discrete output
34 external inputs
36 first external input
38 second external input
40 peripheral controller input output ports
42 first peripheral controller input output port
44 second peripheral controller input output port
46 third peripheral controller input output port
48 fourth peripheral controller input output port
50 fifth peripheral controller input output port
52 sixth peripheral controller input output port
54 trailer software function
56 trailer event
58 three input line combination
60 function
62 QNC header status
64 enabled by
66 tractor
68 trailer
70 power supply
72 trailer light
74 solar cells
76 antenna
78 decoy antenna
80 shipping container open

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
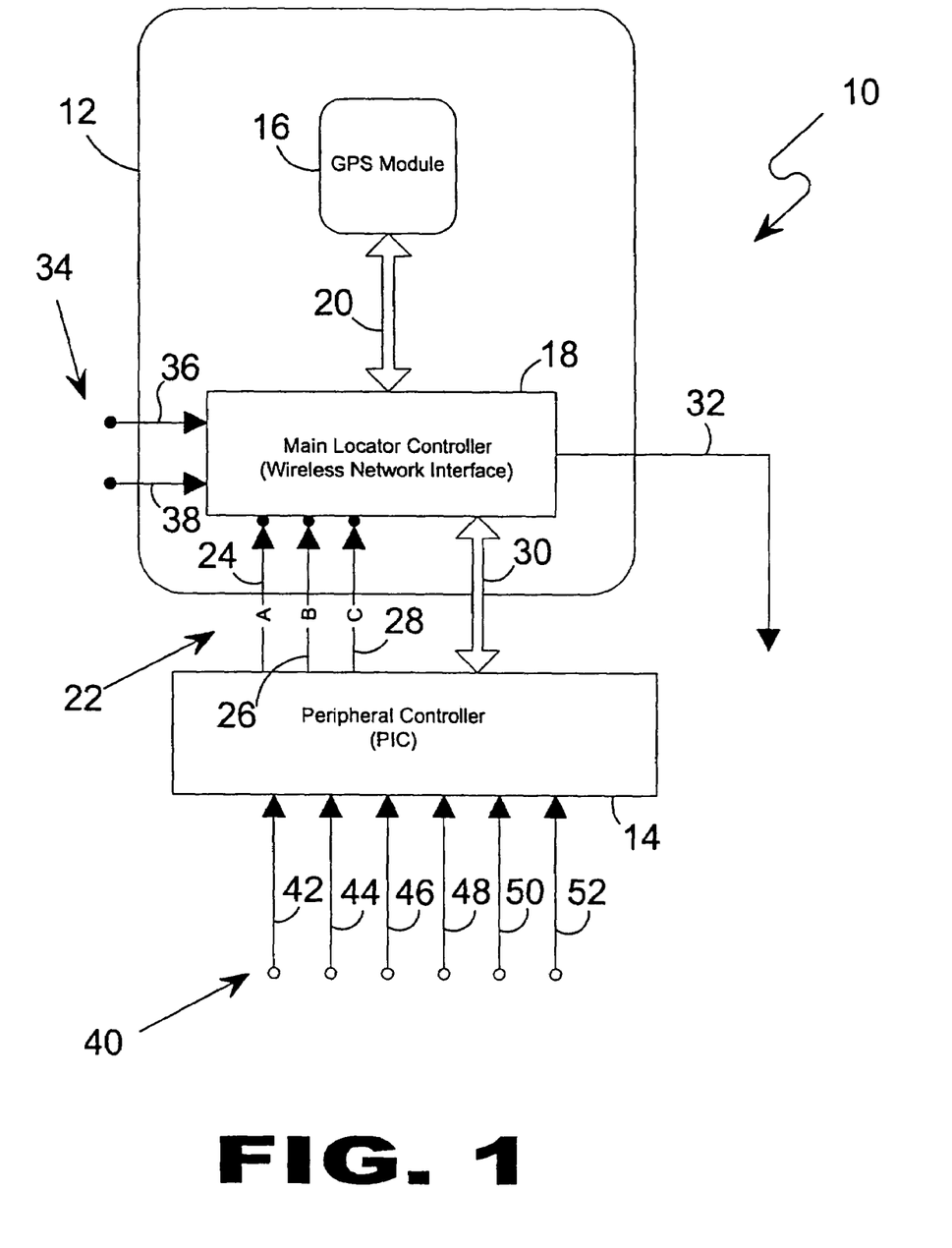
FIG. 1 is a diagrammatic view of the present invention.

Referring to FIG. 1, shown is the security tracker (10) of the present invention. The security tracker is comprised of a peripheral controller (14) and a basic locator unit (12) having a main controller (18) and a GPS module (16). The main controller (18) communicating (20) with the GPS module (16) can initiate a locator sequence whose location data can be stored for later download or transmitted to a remote location. The peripheral controller (14) has six external input/outputs (42, 44, 46, 48, 50, 52) that are used to communicate (40) with the various devices within the protected environment. There are also three lines (24, 26, 28) wherein the peripheral controller (14) can communicate (22) with the main controller (18) using pulses of short or long duration, creating fourteen different combinations interpreted by the main controller (18) as different commands. In addition, there can be a serial communication (30) between the main controller (18) and peripheral controller (14). The basic locator unit (12) also has external inputs (34) comprising lines (36, 38) and discrete output (32).

Figure 2:
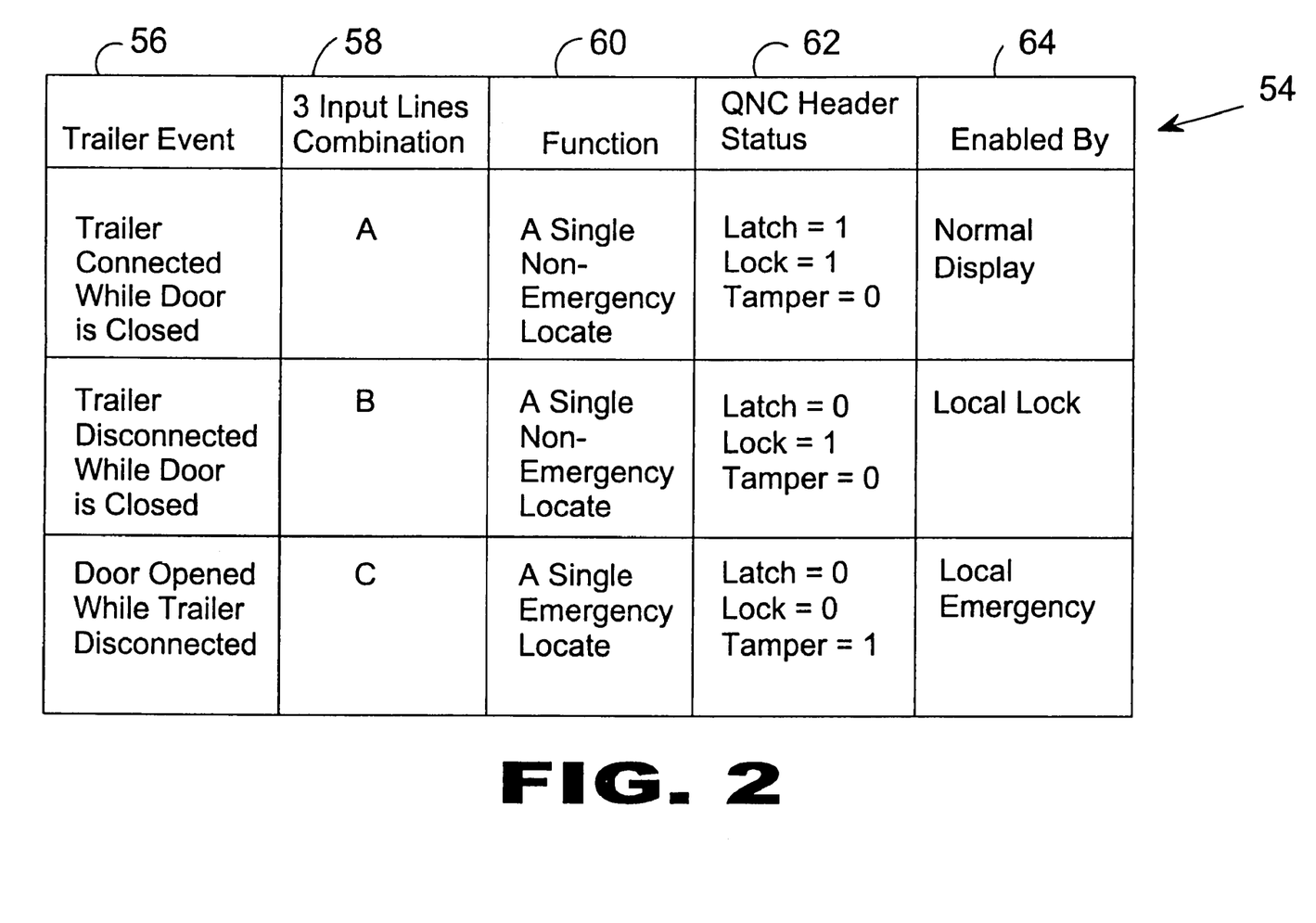
FIG. 2 is a chart of programmable software responses

FIG. 2 is a chart (54) of programmable software responses. Shown is one possible use of the security tracker (10) used for a shipping container trailer. The security tracker (10) can be used to monitor trailer event (56) and transfer the sensor data (14) to the main controller (18) using the three line inputs (58). The security tracker having predetermined responses (60) uses the three line input data (62) to execute a predetermined response (64).

Figure 3:
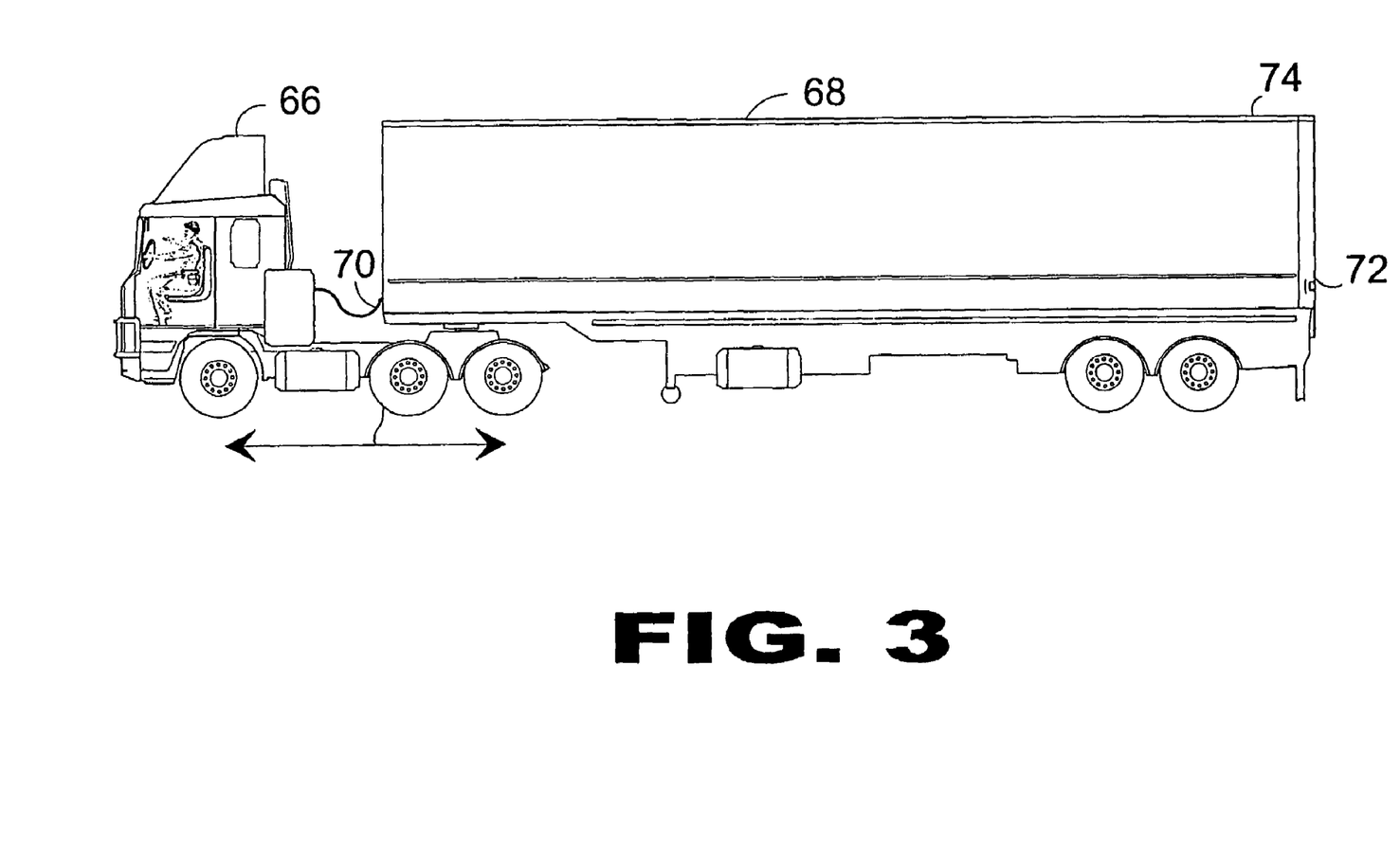
FIG. 3 is a side view of a tractor-trailer

Referring to FIG. 3, shown is a side view of a tractor-trailer. In the preferred embodiment, the monitored article is a portable sealable shipping container used in the transportation of freight aboard ships, rail cars and motorized vehicles, such as tractor hauled trailers. Accordingly, the present invention provides means for managing the assets within the container whether or not the container (68) is tethered to a transportation medium such as a tractor (66). The security tracker can be incorporated into a trailer taillight (72) as a covert apparatus deriving its power from the trailer source (70) or from solar cells (74). The security tracker can be programmed to record for later download environmental condition within the trailer or it can initiate an emergency communication based on some environmental condition such as having the trailer door opened.

Figure 4:
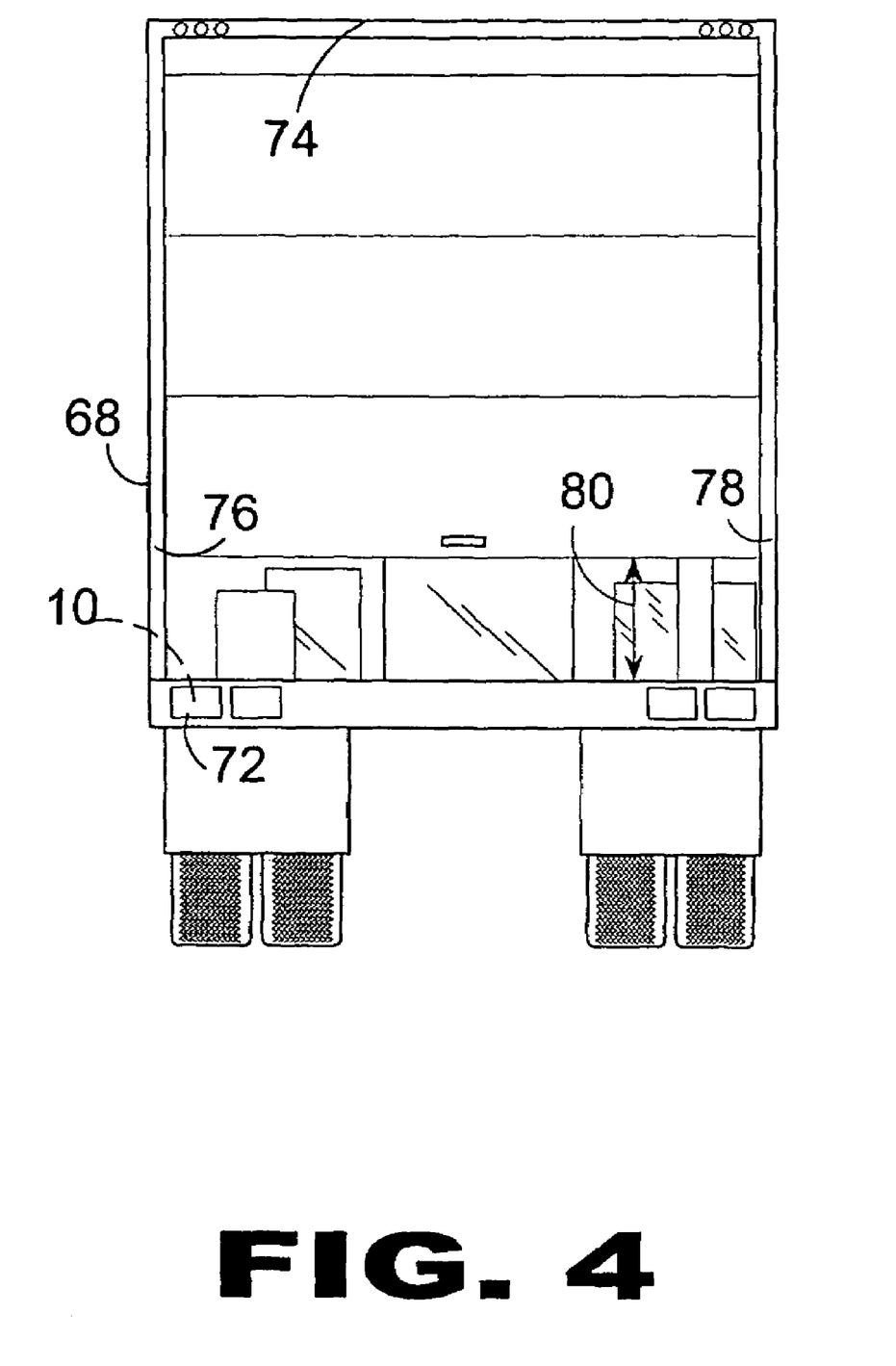
FIG. 4 is a back view of a trailer

Referring to FIG. 4, shown is the rear of a shipping container trailer (68) having the security tracker (10) covertly incorporated into one of the trailer (68) tail lights (72). The security tracker (10) can be programmed to record for later download or initiate an emergency communication with a remote location when the trailer is connected to the truck, when the trailer is disconnected from the truck and when the trailer door is opened while the trailer is disconnected. If the tractor is disconnected from the trailer and the trailer door is opened (80), an emergency location can be initiated by security tracker (10). As previously stated, the responses of the security tracker can be preprogrammed depending on the type of sensors and pertinent environmental conditions to be monitored.

Figure 5:
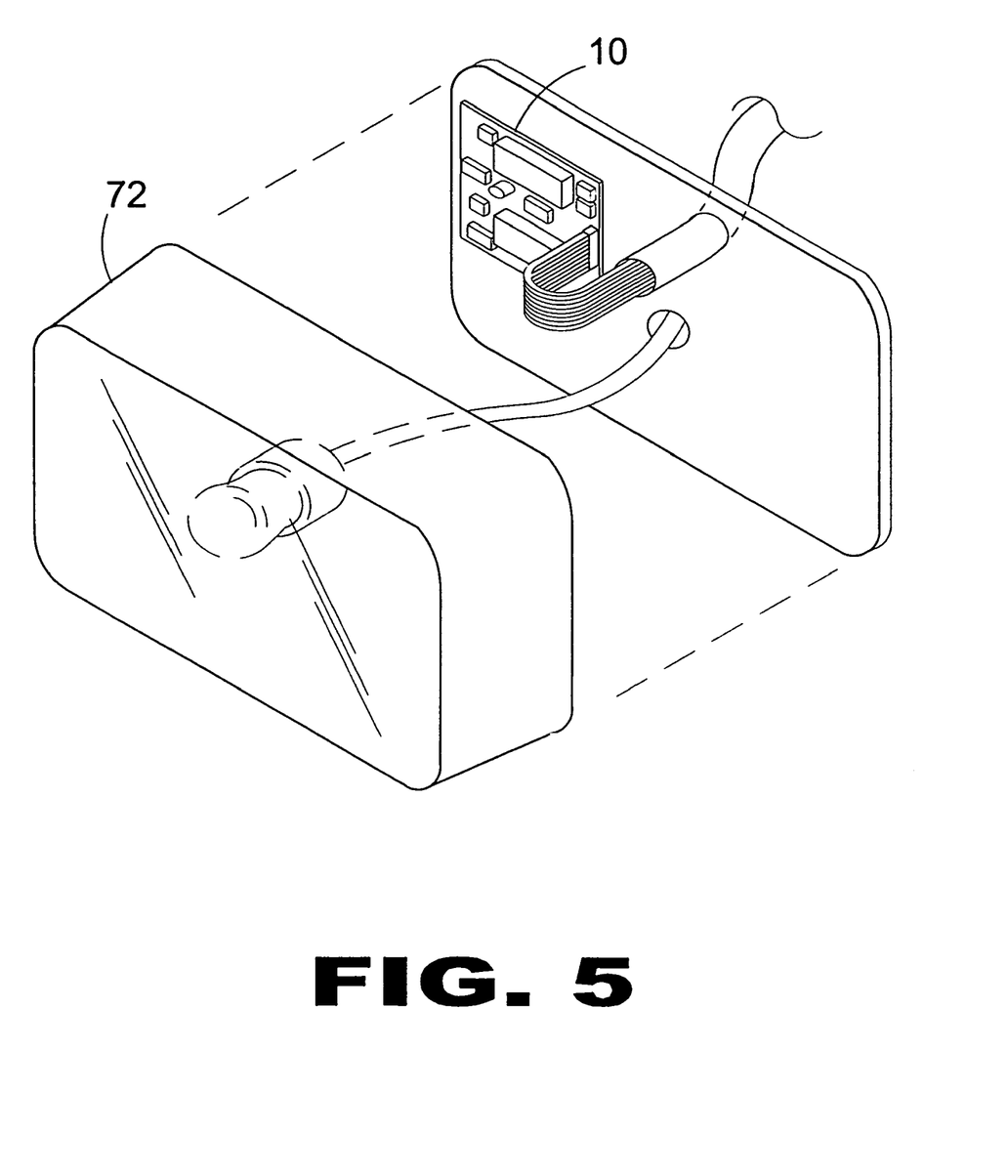
FIG. 5 is an exploded view of a trailer light incorporating the present invention.

Referring to FIG. 5, shown is a shipping container trailer tail light (72) having the security tracker (10) incorporated therein the security tracker (10) can be incorporated as a covert device having one or more sensors connected with the peripheral controller whereby when a sensor indicates a stimulus event the peripheral controller can initiate a preprogrammed response.

Figure 6:
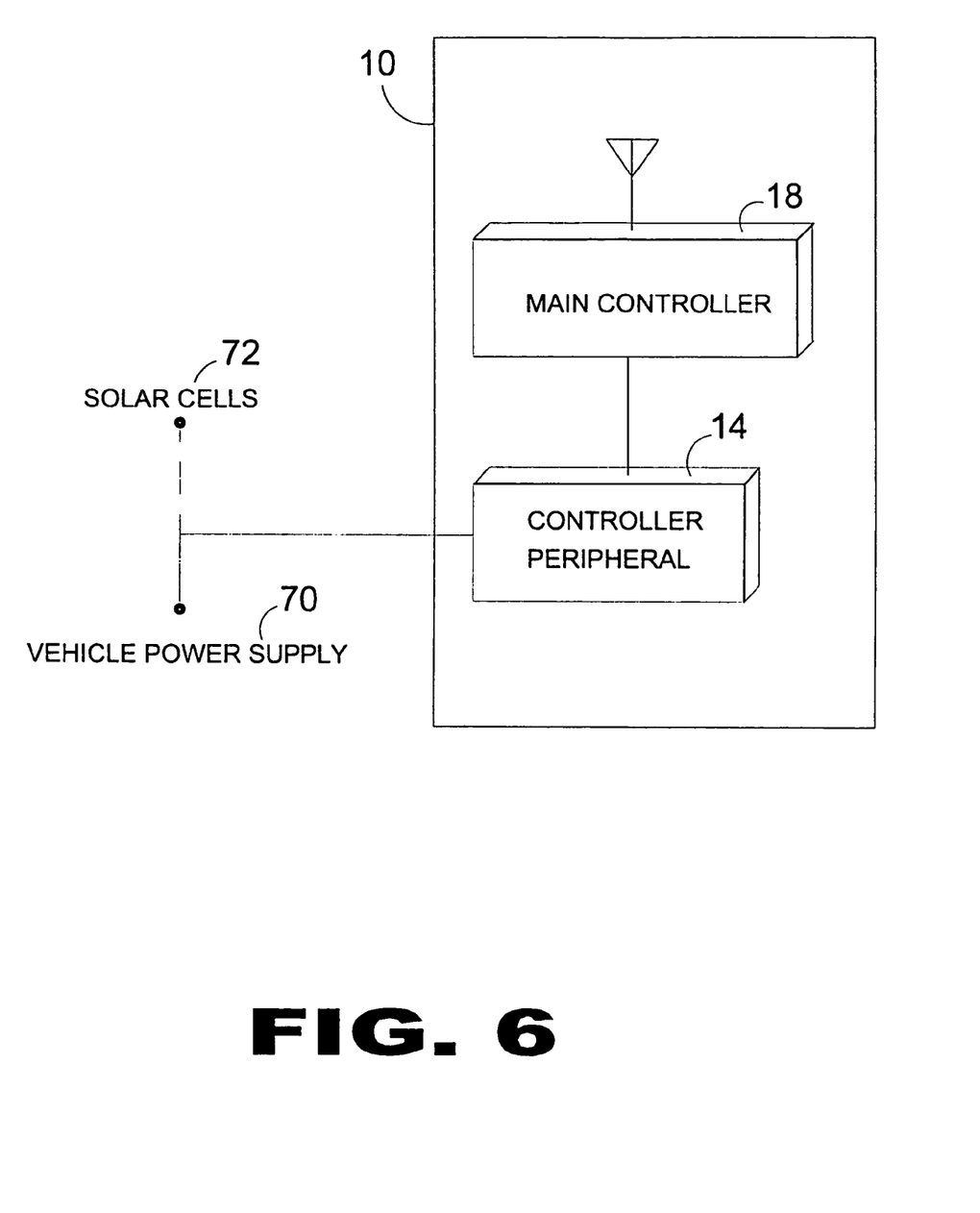
FIG. 6 is a block diagram of the power source for the present invention.

Referring to FIG. 6, shown is the security tracker (10) comprising the peripheral controller (14) and main controller (18) deriving power from the vehicle power (70) or from solar cells (72).

What is claimed is new and desired to be protected by Letters Patent is set forth in the appended claims:

1. A security tracker for use with and in combination with a tractor-trailer comprising:
   a) a peripheral controller and a basic locator unit covertly mounted in a tail light of said trailer;
   b) said basic locator unit having a main controller and a GPS module, said main controller communicating with said GPS module for initiating a locator sequence whose location data is stored for later download or transmitted to a remote location;
   c) said peripheral controller having external input/outputs for communicating with sensing devices in a protected environment within said trailer;
   d) multiple communication lines between said peripheral controller and said main controller using pulses of short and long durations creating a finite number of different combinations of said pulses interpreted by said main controller as different commands;
   e) said security tracker being programmed to record for later download or initiate a communication with a remote location when the trailer is connected to said tractor, when the trailer is disconnected from said tractor, when the trailer door is opened while the trailer is disconnected, and transmitting location information under prescribed situations; and
   f) said trailer being provided with a decoy antenna.

2. A method of covertly tracking assets sealed within a trailer comprising the steps of:
   a) covertly mounting within a tail light of said trailer a peripheral controller and a basic locator unit, said basic locator unit having a main controller and a GPS module, said main controller communicating with said GPS module for initiating a locator sequence whose location data is stored for later download or transmitted to a remote location, said peripheral controller having external input/outputs for communicating with sensing devices in a protected environment within said trailer, multiple communication lines between said peripheral controller and said main controller using pulses of short and long durations creating a finite number of different combinations of said pulses interpreted by said main controller as different commands;
   b) programming said security tracker to record for later download or initiate a communication with a remote location when the trailer is connected to said tractor, when the trailer is disconnected from said tractor, when a trailer door is opened while the trailer is disconnected from said tractor, and transmitting location information under prescribed situations; and
   c) deploying decoy antennas on said trailer.

* * * * *